United States Patent Office 2,933,501
Patented Apr. 19, 1960

2,933,501
SCOPINE ETHERS

Ernst Jucker, Binningen, Basel, and Adolf J. Lindenmann, Basel, Switzerland, assignors to Sandoz Ltd., Basel, Switzerland No Drawing. Application September 19, 1958
Serial No. 761,950

Claims priority, application Switzerland
September 26, 1957

5 Claims. (Cl. 260—292)

This invention relates to new organic compounds and is particularly directed to novel benzhydryl scopine ethers either in the form of the free base or in the form of acid addition salts thereof with pharmacologically acceptable acids, said ethers having the general Formula I

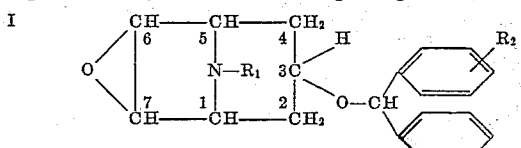

wherein $R_1$ is lower alkyl, either straight chain or branched, and $R_2$ is selected from the group consisting of hydrogen and halogen.

The acid addition salts of novel scopine benzhydryl ethers of Formula I are stable crystalline salts and are prepared by reacting the basic scopine benzhydryl ethers with pharmacologically acceptable inorganic or organic acids such as hydrochloric acid, hydrobromic acid, hydroiodic acid, sulfuric acid, phosphoric acid, nitric acid, benzoic acid, benzene sulfonic acid, naphthalene sulfonic acid, naphthalene 1,5-disulfonic acid, salicylic acid, glycolic acid, acetic acid, succinic acid, mandelic acid, nicotinic acid, tartaric acid, levulinic acid, stearic acid, myristic acid, palmitic acid, citric acid, isocitric acid, maleic acid, glutaric acid, malic acid, pimelic acid, lactic acid and the like.

The free scopine ether base of the invention is also readily converted into quaternary ammonium salts. For this purpose, the N-alkyl-6,7$\beta$-epoxy-nortropine-3-benzhydryl ether base is reacted with a lower alkyl derivative of a pharmacologically acceptable anion such as methyl bromide, methyl chloride, methyl iodide, dimethyl sulfate, diethyl sulfate and the like. Since the pharmacological activity of N-alkyl-6,7$\beta$-epoxy-nortropine-3-benzhydryl quaternary ammonium salt is due to the cation, any anion which is pharmacologically acceptable may be used.

Tropine benzhydryl ethers are known as in U.S. Patent No. 2,595,405 issued May 6, 1952, which describes the preparation of the ether by reacting tropine with diphenyl diazo methane and as in U.S. Patent No. 2,706,198 which shows the preparation of this ether by reacting tropine with diphenyl halomethane in an acidic medium and further shows reaction of tropine with ring halogen-substituted diphenyl halomethanes.

These prior tropine benzhydryl ethers in the form of their acid salts have pronounced anti-histamine and high atropine-like activity, i.e., inhibiting effect upon effector organs innervated by posaganlionic chloinergic nerves (see column 2, lines 63–65 of U.S. Patent 2,706,198 and column 1, lines 5–10 of U.S. Patent 2,595,405). The tropine benzhydryl ethers appear to exert a characteristic acetylcholin inhibiting function which is typical of the pharmacological behavior of atropine.

These prior tropine ethers are characterized primarily by the long duration of their antihistamine activity and less by its intensity (see U.S. Patent 2,782,200, column 2, lines 10–12). In this respect, their effect is superior to that of the typical anti-histamines employed therapeutically.

It was, therefore, to be expected that the novel N-alkyl-6,7$\beta$-epoxy-nortropine-3-benzhydryl ethers (scopine ethers) would exhibit a similar pharmacodynamic behavior as in the case of the benzhydryl tropine ethers.

However, the new ethers derived from N-alkyl-6,7$\beta$-epoxy-nortropine-3-benzhydryl ether (scopine ether) obtainable by the processes according to the invention exhibit new and completely unknown pharmacodynamical properties as on one hand they have only a weak atropine- or scopolamine-like (anticholinergic) activity, but on the other hand, they differ completely from the above-mentioned alkaloids by their pronounced stimulatory activity on spinal reflexes.

So, intravenous administration of 2–10 mg./kg. scopine benzhydryl ether pronouncedly enhances mono- and polysynaptic spinal reflexes on spinal as well as on intact anesthetized cats. The muscle contraction evoked by direct stimulation of the motor nerve is not affected by this drug. These experiments show that the new and up to now unknown scopine benzhydryl ether enhances spinal reflexes because of direct interference with spinal synapsis. This scopine ether produces in the unanesthetized animals a pronounced motor stimulation and excitation.

The previously unknown scopine benzhydryl ethers prepared according to the invention can therefore be employed, e.g., in the therapy of diseases of the spinal cord in which the spinal reflexes are depressed. Due to the enhancing effect on reflexes and due to this stimulatory and excitatory effect the drugs can also be used as central stimulants in order to treat diseases of the central nervous system, especially states of psychic depression.

METHODS OF PREPARATION OF NOVEL SCOPINE ETHERS

The novel benzhydryl scopine ethers of Formula I can be prepared by reacting a diphenyl methane derivative of the general Formula II II 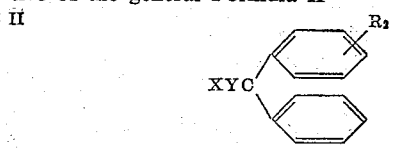

wherein $R_2$ is selected from the group consisting of hydrogen and halogen, X is hydrogen, Y is halogen, e.g., chlorine or bromine, or XY is diazo radical, $N_2$, with an N-alkyl-nortropine compound having the 1,2-epoxide ring in the 6,7 position and in accordance with the Formula III III 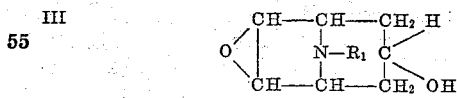

wherein $R_1$ is a lower alkyl, whereby said diphenyl methane derivative etherifies said 6,7-epoxy-N-alkyl-nortropine to produce said novel benzhydryl ethers of scopine having the structure shown in Formula I.

Another method for the preparation of novel benzhydryl ethers of scopine defined by Formula I is by etherification reaction of the said diphenyl methane derivative of Formula II with the stereoisomeric forms of N-alkyl-6-hydroxy-nortropines or where necessary the hydrolyzable 6-acyl derivative of said stereoisomeric forms of N-alkyl-6-hydroxy nortropines which has the Formula IV IV 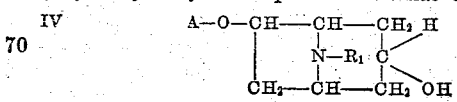

in which $R_1$ is a lower alkyl and A is selected from the group consisting of hydrogen or acyl which is easily and subsequently hydrolyzed, the benzhydryl etherified reaction product of Compound IV being subjected to reaction at the 6-hydroxyl position in order to form the 6,7-epoxide ring.

In the 6,7-epoxide ring formation, the acyl group at the 6-hydroxyl (A in Formula IV represents easily hydrolyzable acyl) is split off and the resulting stereoisomeric forms of N-alkyl-6-hydroxy-nortropine-3-benzhydryl ethers in accordance with Formula V V 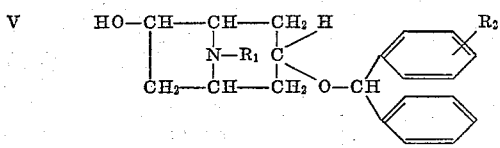

wherein $R_1$ and $R_2$ have the same significance as in Formula I, are treated with a sulfonyl chloride of the Formula VI VI 

wherein Z is selected from the group consisting of alkyl, aryl, aralkyl and alkaryl radicals in order to form sulfonic acid esters in accordance with Formula VII VII 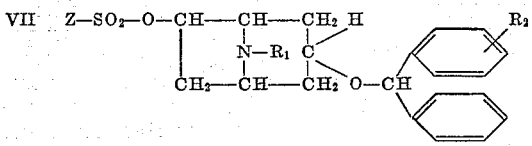

wherein Z has the significance as in Formula VI and $R_1$ and $R_2$ have the significance as in Formula I.

The organic sulfonic acid esters of Formula VII are converted by reaction with an organic base into either of the stereoisomeric forms of N-alkyl-6,7-nortropenyl-3-benzhdryl ethers in accordance with Formula VIII VIII 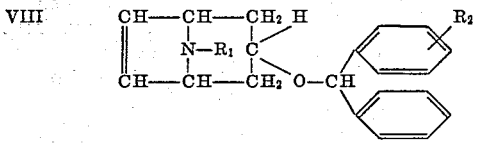

wherein $R_1$ and $R_2$ have the same significance as in Formula I.

The 6,7-epoxide ring is readily obtained by epoxidizing N-alkyl-6,7-nortropenyl-3-benzhydryl ethers of Formula VIII with an epoxidizing agent, such as trifluoro peracetic acid.

In the foregoing compounds, the $\alpha$ and $\beta$ prefixes signify the stereoisomeric forms of the 7-membered cycloalkanes bearing the 1,5-imino bridge

and compounds which are $\beta$ with respect to the substituent contain that substituent on the same side of the plane of the 7-membered ring to which the 1,5-cyclo-imino bridge is attached, whereas compounds which are $\alpha$ with respect to the substituent contain that substituent on the other side of the plane of the 7-membered ring to which said 1,5-cyclo-imino bridge is attached.

In nortropine, the hydroxyl in the 3 position is on the opposite side of the plane of the 7-membered ring from the side of attachment of the 1,5-cyclo-imino bridge, and the nomenclature is Nor-tropane-3$\alpha$-ol, while in Nor-pseudo-tropine, the hydroxyl in the 3 position is on the same side of the plane of the 7-membered ring as the side of attachment of the 1,5-cyclo-imino bridge, and the nomenclature in this case is Nor-tropane-3$\beta$-ol.

This nomenclature to identify the stereoisomeric forms of the compounds described herein including the new compounds of the invention follows that proposed for the nomenclature of the steroids and triterpenoids and is described in Journal of the Chemical Society (London), 1953, at page 721.

Various illustrative methods disclosed for the production of stereoisomeric benzhydryl ethers of scopine in accordance with the invention are summarized hereinafter briefly and the starting materials, intermediates and final products can be seen from the Reaction Scheme set out below.

REACTION SCHEME

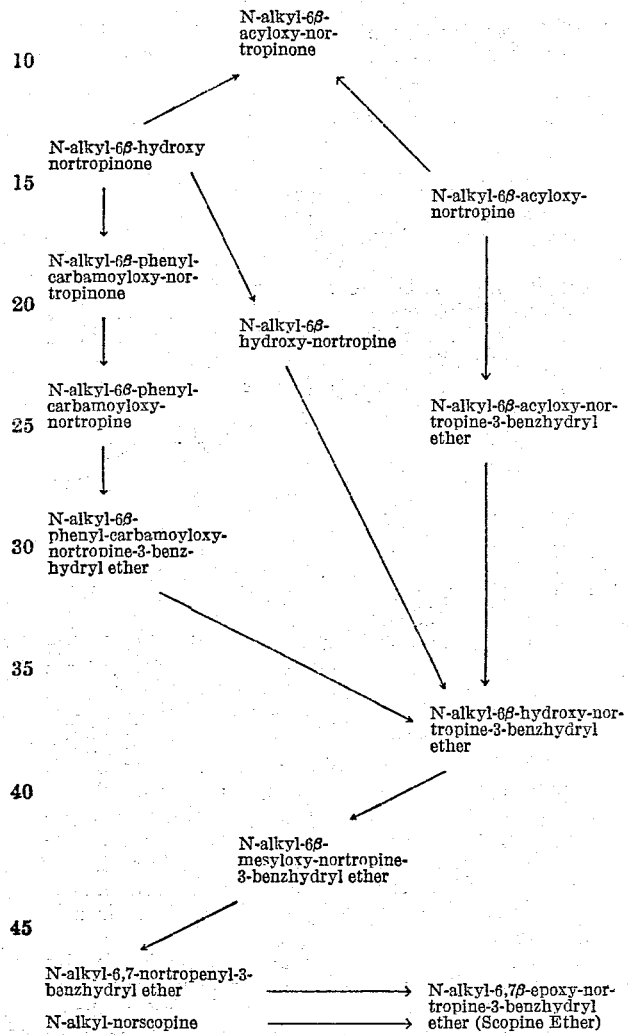

ILLUSTRATIVE METHODS OF SYNTHESIS (1) Diphenyl diazomethane or diphenyl halomethane etherification of scopine (6,7$\beta$-epoxy-tropine-3$\alpha$-ol).

(2) Diphenyl halomethane or diphenyl diazomethane etherification of N-alkyl-6-acyloxy-nortropines followed by saponification to liberate the N-alkyl-6-hydroxy-nortropine-3-benzhydryl ethers, formation of the sulfonic acid ester derivatives of the N-alkyl-6-hydroxy-nortropine- and the N-alkyl-6,7-nortropenyl-3-benzhydryl ethers by splitting out the ester and by epoxidation of the N-alkyl-6,7-nortropenyl-3-benzhydryl ethers to the scopine ethers.

(3) Diphenyl halomethane or diphenyl diazomethane etherification of either N-alkyl 3$\alpha$,6$\beta$-dihydroxy-nortropane or N-alkyl-3$\beta$,6$\beta$-dihydroxy nortropane whereby the N-alkyl-6$\beta$-hydroxy-nortropine-3$\alpha$-benzhydryl ether or the N-alkyl-6$\beta$-hydroxy-nortropine-3$\beta$-benzhydryl ether is formed.

Under reaction method (1), the solution of scopine (6,7$\beta$-epoxy-tropane-3$\alpha$-ol) and diphenyl diazomethane in an anhydrous, water-immiscible solvent free from hydroxyl groups, e.g. benzene, is left for some time at an elevated temperature. The reaction mixture, if necessary after dilution with the solvent employed, is shaken out with an aqueous acid to extract the basic end product which is liberated from the acidic extract by rendering it alkaline and extracting with a water-immiscible solvent. On evaporation, this extract leaves the scopine-benzhydryl ether (6,7β-epoxy-tropine-3α-benzhydryl ether) which can be purified by known methods, e.g. by conversion into a salt and its recrystallization. A variation of this procedure is the etherification of scopine with diphenyl halomethane derivatives in the presence of an acid binding compound, for example sodium ethylate or sodium carbonate, at elevated temperature.

Under procedure (2) an N-alkyl-nortropane-3α,6β-diol (N-alkyl-6β-hydroxy-3α-nortropine) acylated in the 6-position, such as e.g. 6β-acetoxy-tropine, is etherified with diphenyl bromomethane or diphenyl diazomethane, the acetyl group is split off with ethanolic sodium solution with slight heating, the 6β-hydroxy-tropine-3α-benzhydryl ether of the Formula V ($R_1=CH_3$, $R_2=H$) thus formed is esterified with an aliphatic or alkyl aromatic sulfonyl chloride, such as e.g. methane sulfonic acid chloride (mesyl chloride) in a suitable organic solvent, such as e.g. chloroform, and in the presence of an organic base, for instance pyridine or triethylamine, the 6β-mesyloxy-tropine-3α-benzhydryl ether is heated in an atmosphere of nitrogen in the presence of an organic base, such as e.g. triethylamine, and the 6,7-tropenyl-3β-benzhydryl ether of the Formula VIII ($R_1=CH_3$, $R_2=H$) thus formed is epoxidised with conventional epoxidizing agents such as peracetic acid, performic acid and the like. A preferred epoxidizing agent is trifluoro peracetic acid.

A useful variation of the foregoing process may be carried out which comprises the replacement of the acetoxy group introduced for the protection of the hydroxyl group in the 6β-hydroxy-tropines or N-alkyl-6β-hydroxy-nortropines of Formula IV ($A=H$, $R_1=alkyl$) by the phenyl carbamoyl residue. As an example, N-ethyl-6β-phenyl carbamoyloxy-nortropine is etherified with diphenyl chloromethane, and the phenyl-carbamoyl group can be split off simply by heating in a high vacuum.

A further method (3) consists in the direct etherification of an N-alkyl-3α,6β- or N-alkyl-3β,6β-dihydroxynortropane, for example 3α,6β-dihydroxy-tropane, with a diphenyl halomethane, separation of the benzhydryl ethers thus formed, and reaction of the 6β-hydroxy-tropine-3α- or -3β- benzhydryl ether of the Formula V ($R_1=CH_3$, $R_2=H$) as described above. This process is shorter but there is the necessity of separating the benzhydryl ether derivatives which have been formed in the 6β-hydroxyl from the main product, the 6β-hydroxy-3α-benzhydryl ether. In the process with a protected 6β-hydroxy group (method (2)) the etherification can only take place at the 3-position.

The starting materials, the stereoisomeric 6β-hydroxy-tropines which may also be acylated, can be obtained according to known methods by condensing hydroxy-succinic acid dialdehyde with acetonedicarboxylic acid and a primary alkyl amine in the presence of a buffer material giving the stereoisomeric 6β-hydroxy-tropinones, and these can be reduced, after being acylated, if desired, to the stereoisomeric 6β-hydroxy-tropines which may in their turn be acylated.

The preparation of the novel compounds and the novel intermediate chemical compounds obtained in the process by which they are secured may be illustrated by the following specific examples. They are given for illustration and not for limitation. All of the temperature values given in the following examples are in degrees centigrade.

EXAMPLE I

Scopine benzhydryl ether (6,7β-epoxy-tropine-3-benzhydryl ether)

A solution of 3 grams of scopine in 5 cubic centimeters of anhydrous benzene was warmed under reflux at 80–85° C. for 5 hours with diphenyl diazomethane (prepared from 7.5 grams of benzophenone hydrazone and 8.5 grams of mercuric (II) oxide). The cooled mixture was then treated with 45 cubic centimeters of benzene and 600 cubic centimeters of 0.5 percent aqueous ice-cooled hydrochloric acid.

After shaking thoroughly the benzene layer was separated and the aqueous hydrochloric solution was subsequently washed with 60 cubic centimeters of benzene and with a total of 120 cubic centimeters of ether. The aqueous layer was then extensively cooled and made alkaline with 30 percent aqueous sodium hydroxide and the alkaline aqueous solution extracted with a total of 500 cubic centimeters of benzene.

The combined benzene extracts were dried over magnesium sulfate, benzene was removed in vacuo, and the hydrochloride was prepared from the oily residue of scopine benzhydryl ether by treating with methanolic hydrochloric acid whilst cooling. The scopine benzhydryl ether hydrochloride was crystallized by dissolving in methanol and addition of ether and then recrystallized from methanol-ether. Melting point: 212–214° C. (with decomposition) from methanol/ether.

EXAMPLE II

Scopine benzhydryl ether (6,7β-epoxy-tropine-3α-benzhydryl ether)

25 grams of 6β-hydroxy-tropinone are dissolved in 150 cubic centimeters of pure anhydrous pyridine and 100 cubic centimeters of acetic anhydride and allowed to stand at room temperature (20–25° C.) for 48 hours. Thereupon, the major portion of the pyridine and excess acetic anhydride was removed in vacuo, and the residue taken up in 150 cubic centimeters of chloroform and washed twice with 50 cubic centimeters of ice-cooled saturated aqueous sodium carbonate solution. The chloroform solution was then dried over anhydrous magnesium sulfate, the chloroform was removed in vacuo and the residue distilled in a high vacuum whereupon 6β-acetoxy-tropinone passed over between 129–132° C. at 0.8 millimeter of mercury.

Hydrobromide: Melting point 192–194° C. (with decomposition) from methanol/ether.

The hydrochloride of 6β-acetoxy-tropinone after crystallization from methanol/ether had a melting point of 199–200° C. (with decomposition).

A solution of 5.6 grams of 6β-acetoxy-tropinone in 15 cubic centimeters of pure anhydrous methanol was hydrogenated in an autoclave for 8 hours at 45° C. with Raney-nickel at an initial hydrogen pressure of 60 atmospheres.

The catalyst was filtered off, the solvent was removed in vacuo and the residue was distilled in a high vacuum, whereupon the 6β-acetoxy-tropine passed over between 130–133° C. at 0.08 millimeter of mercury. The compound was somewhat hygroscopic.

6β-acetoxy-tropine-naphthalene-1.5-disulfonate: Melting point 237–239° C. (with decomposition) from methanol/ether.

A solution of 13.6 grams of diphenyl bromomethane in 6 cubic centimeters of absolute benzene was added dropwise at 110° C. with stirring within 1 hour to a mixture of 10 grams of 6β-acetoxy-tropine and 2.6 grams of sodium carbonate. Subsequently, the reaction mixture was maintained at 125° C. for another 4 hours with further stirring. After cooling, 100 cubic centimeters of water and 100 cubic centimeters of benzene were added, the mixture was shaken, the benzene layer was separated, and the aqueous portion was extracted again with altogether 160 cubic centimeters of benzene. The combined benzene extracts were then shaken out with a total of 240 cubic centimeters of ice-cooled aqueous 2N-hydrochloric acid, the aqueous hydrochloric extract was washed with 90 cubic centimeters of ether and rendered alkaline whilst cooling with 30 percent aqueous sodium hydroxide solution. It was shaken out with altogether 380 cubic centimeters of benzene, the combined benzene extracts were dried over magnesium sulfate, and benzene was evaporated in vacuo. The residue of 6β-acetoxy-tropine-3α-benzhydryl ether was crystallized from benzene/petroleum ether. Melting point: 109–111° C. from benzene.

A solution of 10.0 grams of 6β-acetoxy-tropine-3α-benzhydryl ether in 40 cubic centimeters of ethanol and 20 cubic centimeters of aqueous 3 N-sodium hydroxide solution was warmed for one hour to 70° C. Then, ethanol was removed in vacuo whereupon an oil separated out. The aqueous alkaline distillation residue was shaken out with a total of 100 cubic centimeters of chloroform, the united chloroform extracts were washed with 40 cubic centimeters of saturated sodium chloride solution and dried over magnesium sulfate, and the chloroform was removed in vacuo. The residue, 6β-hydroxy-tropine-3α-benzhydryl ether, was crystallized from benzene and recrystallized from benzene/petroleum ether or benzene. Melting point 134–136° C.

PREPARATION OF 6β-MESYLOXY-TROPINE-3α-BENZHYDRYL ETHER

A solution of 12.0 grams of 6β-hydroxy-tropine-3α-benzhydryl ether in 36 cubic centimeters of anhydrous chloroform and 3.0 cubic centimeters of absolute pyridine was treated with 2.88 cubic centimeters of methane sulfonic acid chloride, whereby it became warm. The reaction mixture was allowed to stand at room temperature for 50 minutes, and was subsequently kept gently boiling under reflux for 5 hours. After cooling, the reaction mixture was treated with 85 cubic centimeters of chloroform and shaken out with a total of 200 cubic centimeters of water in five portions. The chloroform solution was then dried over magnesium sulfate, the chloroform removed in vacuo, and the residue of 6β-mesyloxy-tropine-3α-benzhydryl ether crystallized from a little benzene by the addition of petroleum ether. Melting point 87–89° C. from benzene/petroleum ether.

Esterification with methane sulfonic acid chloride could also be carried out in the presence of triethyl amine: 0.24 cubic centimeter of methane sulfonic acid chloride was added to a solution of 1.0 gram of 6β-hydroxy-tropine-3α-benzhydryl ether in 2 cubic centimeters of absolute chloroform and 0.13 gram of triethyl amine, and the mixture allowed to stand at room temperature for 18 hours. Subsequently, it was heated to gentle boiling under reflux for another 5 hours. After cooling, the reaction mixture was treated with 6 cubic centimeters of chloroform and shaken out with a total of 21 cubic centimeters of water in 5 portions. The chloroform solution was dried over magnesium sulfate, and the chloroform evaporated in vacuo. The residue was chromatographed over aluminum oxide, whereby the 6β-mesyloxy-tropine-3α-benzhydryl ether was eluted with a solvent mixture of benzene/petroleum ether (4:1). Melting point: 88–90° C. from benzene/petroleum ether.

By treatment of a methanolic solution of 6β-mesyloxy-tropine-3α-benzhydryl ether with the calculated amount of naphthalene-1.5-disulfonic acid, dissolved in methanol, 6β-mesyloxy-tropine-3α-benzhydryl ether naphthalene-1.5-disulfonate was obtained. Melting point: 194–195° C. (with decomposition) from methanol/ether.

CONVERTING OF 6β-MESYLOXY-TROPINE-3α-BENZHYDRYL ETHER TO 6,7-TROPENYL-3α-BENZHYDRYL ETHER 2.25 grams of 6β-mesyloxy-tropine-3α-benzhydryl ether, 4.5 cubic centimeters of triethyl amine and 0.3 cubic centimeter of diethyl aniline were sealed under nitrogen in a pressure tube and heated at 125–135° C. for 2 hours. The content of the pressure tube was then strongly cooled and the liquid portion was decanted. The bright yellow solution was concentrated in vacuo, taken up in 50 cubic centimeters of chloroform and washed twice with 20 cubic centimeters of aqueous saturated sodium carbonate solution. The chloroform solution was dried over magnesium sulfate and the chloroform and the residual triethyl amine were removed in vacuo. The 6,7-tropenyl-3α-benzhydryl ether could only be distilled with partial decomposition. Boiling point: 175–185° C. at a pressure of 0.05 millimeter of mercury.

EPOXIDIZATION OF 6.7-TROPENYL-3α-BENZHYDRYL ETHER 420 milligrams of trifluoro acetic acid were added with cooling to a solution of 1.25 grams of 6.7-tropenyl-3α-benzhydryl ether in 20 cubic centimeters of acetonitrile, and the mixture was subsequently treated at a maximum temperature of 25° C. within 30 minutes, whilst stirring, with a solution of trifluoro peracetic acid (prepared from 1.56 grams of trifluoro acetic anhydride and 0.22 gram of 90 percent hydrogen peroxide) in 10 cubic centimeters of methylene chloride. The reaction mixture was stirred for an additional 30 minutes at room temperature and then shaken out with a total of 100 cubic centimeters of water. The aqueous solution was rendered alkaline with 30 percent aqueous sodium hydroxide solution, and extracted with a total of 150 cubic centimeters of chloroform.

The chloroform extracts were combined, dried over magnesium sulfate and the chloroform evaporated in vacuo. The hydrochloride was prepared from the oily residue with the calculated amount of methanolic hydrochloric acid, the scopine benzhydryl ether hydrochloride crystallizing out on addition of a small amount of ether. After recrystallization from methanol/ether, the compound melted at 212–214° C. (with decomposition).

On addition of the calculated amount of oxalic acid to a methanolic solution of scopine benzhydryl ether (prepared from the hydrochloride), the acid oxalate of scopine benzhydryl ether crystallized with 1 molecule of methanol of crystallization on addition of a little ether.

Scopine benzhydryl ether (prepared from 1 gram of the hydrochloride according to the usual methods) was dissolved in 3 cubic centimeters of acetone and treated with 3 cubic centimeters of methyl bromide in order to prepare the quaternary ammonium salt. After standing for 15 hours at room temperature, the scopine benzhydryl ether bromomethylate started to separate as crystals after some time. It was filtered off and recrystallized from methanol/acetone/ether. Melting point 214–215° C. (with decomposition).

EXAMPLE III

*Scopine benzhydryl ether (6.7β-epoxy-tropine-3α-benzhydryl ether)*

A solution of 4.0 grams (1/50 of a mole) of 6β-acetoxy-tropine (prepared as described in Example II) in 5 cubic centimeters of benzene was warmed under reflux at 85–90° C. for 5 hours with diphenyl diazomethane (prepared from 7.9 grams of benzophenone hydrazone and 8.8 grams of mercuric (II) oxide). The cooled reaction mixture was then treated with 100 cubic centimeters of benzene and 850 cubic centimeters of 0.5 percent aqueous ice-cooled hydrochloric acid. After shaking, the benzene layer was separated and the aqueous acid layer was subsequently washed with another 100 cubic centimeters of benzene and then with a total of 250 cubic centimeters of ether. Thereupon, the acid aqueous solution was rendered alkaline with 30 percent aqueous sodium hydroxide solution whilst cooling strongly and thereafter extracted with a total of 800 cubic centimeters of benzene. The combined benzene extracts were dried over magnesium sulfate and the benzene was removed under vacuum. The residue of 6β-acetoxy-tropine-3α-benzhydryl ether was crystallized from a benzene-petroleum ether mixture. Melting point: 109–110° C. The mixed melting point with a product prepared from 6β-acetoxy-tropine with diphenyl bromomethane showed no depression.

Further processing was carried out as described in Example II. The end product, the scopine benzhydryl ether hydrochloride, melted at 212–214° C. (with decomposition).

EXAMPLE IV

*Scopine benzhydryl ether (6,7-epoxy-tropine-3α-benzhydryl ether)*

A solution of 2.47 grams of diphenyl bromomethane in 6 cubic centimeters of absolute benzene was slowly added at 110° C. with stirring within 1 hour to a mixture of 2.76 grams of 6β-phenyl-carbamoyloxy-tropine (prepared according to G. Fodor et al., J. Chem. Soc. 1957, 1349) and 0.53 gram of sodium carbonate. Subsequently, the reaction mixture was maintained with further stirring at 125° C. for another 5 hours. Then, 100 cubic centimeters of benzene and 100 cubic centimeters of water were added, whereby separation of crystals occurred. After briefly standing in the cold it was filtered, the filtration residue was dissolved in 40 cubic centimeters of chloroform, and shaken with 20 cubic centimeters of 30 percent aqueous sodium hydroxide solution. The chloroform portion was separated, dried over potassium carbonate, and the chloroform was removed in vacuo. After purification via the hydrochloride and the liberation of the base by the usual methods, the 6β-phenyl-carbamoyloxy-tropine-3α-benzhydryl ether melted at 154–156° C. after recrystallization from benzene/petroleum ether.

CONVERSION OF 6β-PHENYL-CARBAMOYLOXY-TROPINE-3α-BENZHYDRYL ETHER TO 6β-HYDROXY-TROPINE-3α-BENZHYDRYL ETHER BY HEATING UNDER VACUUM 1.5 grams of 6β-phenyl-carbamoyloxy-tropine-3α-benzhydryl ether were slowly heated in a distillation flask in a high vacuum at 0.05 millimeter of mercury. At a temperature of 195° C. gas evolution could be observed in the molten substance, and simultaneously the vacuum decreased to 0.3 millimeter of mercury. At a temperature between 230° C.–240° C. at 0.15 millimeter of mercury the 6β-hydroxy-tropine-3α-benzhydryl ether distilled as a colorless oil which solidified as crystals in the cooled receiver. Melting point: 132–134° after recrystallization from benzene/petroleum ether.

The mixed melting point with 6β-hydroxy-tropine-3α-benzhydryl ether prepared from 6β-acetoxy-tropine-3α-benzhydryl ether by saponification with ethanolic sodium hydroxide solution (Example II) showed no depression.

The further reactions can be carried out in the same manner as described in Example II, whereby scopine benzhydryl ether hydrochloride is obtained which melts at 212–214° C. (with decomposition).

EXAMPLE V

*Scopine benzhydryl ether (6,7-epoxy-tropine-3α-benzhydryl ether)*

A solution of 9.4 grams of diphenyl bromomethane in 6 cubic centimeters of absolute anhydrous benzene was added slowly with stirring at 110° C. within 1 hour to a mixture of 3.0 grams of 3α,6β-dihydroxy-tropane and 1.0 gram of sodium carbonate. Subsequently, the mixture was maintained at 125° C. for another 5 hours whereby a hard mass was slowly formed. After cooling, 100 cubic centimeters of water and 100 cubic centimeters of benzene were added to the reaction mixture and well shaken. A crystalline portion, insoluble in this solvent mixture, which is the 6β-hydroxy-tropine-3α-benzhydryl ether hydrobromide, was filtered off and recrystallized from methanol/ether. Melting point: 237–239° C. (with decomposition).

The free base was prepared from the hydrobromide according to known methods. Melting point: 134–135° C. from benzene/petroleum ether.

The mixed melting point with a product prepared from 6β-acetoxy-tropine and diphenyl bromomethane and subsequent saponification to eliminate the acetyl in the 6β-position, did not show any depression.

The isomeric 3α-hydroxy-tropine-6β-benzhydryl ether was obtained from the filtrate (benzene/water mixture) by the usual working up methods, and, after recrystallization from a mixture of acetone and petroleum ether, melted at 146–148° C.

Hydrobromide: Melting point 217–219° C. (with decomposition) from methanol/ether.

The 6β-hydroxy-tropine-3α-benzhydryl ether which was obtained in this example was further reacted in accordance with the procedure described in Example II. The end product, the scopine benzhydryl ether hydrochloride, had a melting point of 212–214° C. (with decomposition).

EXAMPLE VI

*N-ethyl-norscopine benzhydryl ether (N-ethyl-6,7β-epoxy-nortropine-3α-benzhydryl ether)*

An aqueous hydrochloric solution of malic acid dialdehyde, prepared by hydrolyzing 88.0 grams of 2.5-diethoxy-3-hydroxy-tetrahydrofurane with 2 litres of aqueous 0.1 N-hydrochloric acid, was added to a solution of 150 grams of acetone dicarboxylic acid, 82.0 grams of ethyl amine hydrochloride and 340.0 grams of sodium acetate in 10 litres of water. The pH of the mixture was adjusted to 4.0. After standing for 48 hours at room temperature, the evolution of $CO_2$ which took place had ceased and the pH had risen to 5.0. 2.5 kilograms of potassium carbonate were dissolved in the dark brown reaction mixture, and the solution extracted with a total of 4 litres of chloroform. The chloroform extract was dried over magnesium sulfate, the solvent was evaporated and the residue was distilled under a high vacuum, whereby the N-ethyl-6β-hydroxy-nortropinone went over at 100–112° C. at a pressure of 0.8 millimeter of mercury as a light yellow oil, which crystallized in the receiver. For further purification the N-ethyl-6β-hydroxy-nortropinone can be recrystallized from a mixture of benzene/petroleum ether or sublimed in vacuo. Melting point: 94–96° C.

5.0 grams of N-ethyl-6β-hydroxy-nortropinone were dissolved in 30 cubic centimeters of absolute pyridine and 100 cubic centimeters of acetic anhydride and allowed to stand at room temperature for 48 hours. Thereupon, the major portion of pyridine and excess acetic anhydride was removed in vacuo, the residue taken up in 50 cubic centimeters of chloroform and washed twice with 20 cubic centimeters of ice cooled, saturated aqueous sodium carbonate solution each time. The chloroform solution was dried over magnesium sulfate, chloroform was evaporated in vacuo and the residue distilled in high vacuo whereupon N-ethyl-6β-acetoxy-nortropinone distilled between 120–123° C. at 0.01 millimeter of mercury.

Hydrobromide: Melting point 187–188° C. (with decomposition) from methanol/ether.

A solutio of 4.5 grams of N-ethyl-6β-acetoxy-nortropinone in 15 cubic centimeters of absolute methanol was hydrogenated in an autoclave at 45° C. for 8 hours with Raney nickel at an initial pressure of 55 atmospheres. The catalyst was removed by filtration, the solvent removed in vacuo and the residue distilled in a high vacuum whereupon the N-ethyl-6β-acetoxy-nortropine went over between 124–128° C. at 0.03 millimeter of mercury.

A solution of 3.7 grams of diphenyl bromomethane in 6 cubic centimeters of absolute benzene was added dropwise at 110° C. with stirring within 1 hour to a mixture of 3.2 grams of N-ethyl-6β-acetoxy-nortropine and 0.8 gram of sodium carbonate. Subsequently, the reaction mixture was maintained at 125° C. for another 4 hours with further stirring. After cooling, 50 cubic centimeters of water and 50 cubic centimeters of benzene were added, the mixture was shaken thoroughly, the benzene layer was separated, and the aqueous portion was extracted again with altogether 80 cubic centimeters of benzene. The combined benzene extracts were shaken out with a total amount of 150 cubic centimeters of ice-cooled aqueous 2 N-hydrochloric acid, the aqueous hydrochloric extract was washed with 50 cubic centimeters of ether and rendered alkaline whilst cooling with 30 percent aqueous sodium hydroxide solution. The alkaline aqueous medium was shaken out with a total of 200 cubic centimeters of benzene, the combined benzene extracts were dried over magnesium sulfate, and benzene removed in vacuo. The residue was dissolved in 50 cubic centimeters of anhydrous ether and treated with dry hydrogen bromide gas until an acidic reaction of pH 3 was obtained. The precipitate soon became crystalline, and was collected on a filter and dried. After recrystallization from a mixture of methanol/ether the melting point of the N-ethyl-6β-acetoxy-nortropine-3α-benzhydryl ether hydrobromide was 186–189° C. (with decomposition).

A solution of 1.0 gram of N-ethyl-6β-acetoxy-nortropine-3α-benzhydryl ether in 12 cubic centimeters of ethanol and 10 cubic centimeters of aqueous 3 N-sodium hydroxide solution was boiled for 2 hours, whereupon a clear solution was obtained. Then, ethanol was removed in vacuo, the residue taken up in 20 cubic centimeters of water and extracted with a total amount of 100 cubic centimeters of chloroform. The combined chloroform extracts were washed with 20 cubic centimeters of saturated sodium chloride solution, dried over magnesium sulfate, and the chloroform was evaporated in vacuo. The residue of N-ethyl-6β-hydroxy-nortropine-3α-benzhydryl ether was crystallized from benzene/petroleum ether. Melting point: 129–131° C.

A solution of 3.0 grams of N-ethyl-6β-hydroxy-nortropine-3α-benzhydryl ether in 9 cubic centimeters of absolute chloroform and 0.72 cubic centimeters of absolute pyridine was treated with 0.67 cubic centimeters of methane sulfonic acid chloride, whereby it became warm. The reaction mixture was allowed to stand at room temperature for 1 hour and was subsequently kept gently boiling under reflux for 3 hours. After cooling, the reaction mixture was treated with 21 cubic centimeters of chloroform and shaken out with a total amount of 40 cubic centimeters of 8 percent aqueous sodium carbonate solution in 6 portions. The chloroform solution was then dried over magnesium sulfate, the chloroform removed in vacuo, and the residue chromatographed over aluminum oxide, whereby the N-ethyl-6β-mesyloxy-nortropine-3α-benzhydryl ether was eluted with a solvent mixture of benzene/petroleum ether (1:1).

For identification purposes the naphthalene-1.5-disulfonate was prepared. Melting point: 180–181° C. (with decomposition) from methanol/ether.

The naphthalene-1.5-disulfonate could also be prepared from the crude N-ethyl-6β-mesyloxy-nortropine-3α-benzhydryl ether without purification by chromatography over aluminum oxide. After removing the chloroform in vacuo 1.86 grams of the oily residue were dissolved in 1 cubic centimeter of absolute methanol and treated with a solution of 0.89 gram of 76 percent naphthalene-1.5-disulfonic acid in 1 cubic centimeter of absolute methanol. After standing several hours in the cold, the crystalline precipitate of the salt was filtered off and recrystallized from methanol. Melting point: 180–181° C. (with decomposition).

5.2 grams of N-ethyl-6β-mesyloxy-nortropine-3α-benzhydryl ether, 10.4 grams of triethyl amine and 0.4 cubic centimeter of diethyl aniline were sealed under nitrogen in a pressure tube and heated at 125–135° C. for 2 hours. The content of the pressure tube was then strongly cooled, and the liquid portion was decanted. This light brown solution was concentrated in vacuo, taken up in 50 cubic centimeters of chloroform and washed twice with 25 cubic centimeters of aqueous saturated sodium carbonate solution each time. The chloroform solution was dried over magnesium sulfate, and the chloroform and the residual triethyl amine were removed under reduced pressure. 610 milligrams of trifluoro acetic acid were added with cooling to a solution of 1.9 grams of the residue of N-ethyl-6.7-nortropenyl-3α-benzhydryl ether in 20 cubic centimeters of methylene chloride, and the mixture was subsequently treated at a maximum temperature of 25° C. within 30 minutes, whilst stirring, with a solution of trifluoro peracetic acid (prepared from 2.25 grams of trifluoro acetic anhydride and 0.32 gram of 90 percent aqueous hydrogen peroxide) in 10 cubic centimeters of methylene chloride. Stirring was continued at room temperature for another 30 minutes, the reaction mixture was extracted with a total of 100 cubic centimeters of water, the aqueous solution was rendered alkaline with 30 percent aqueous sodium hydroxide solution, and extracted with a total amount of 150 cubic centimeters of chloroform. The combined chloroform extracts were dried over magnesium sulfate, and the chloroform removed in vacuo. The oily residue (714 milligrams) was chromatographed over aluminum oxide, whereby the N-ethyl-norscopine-3α-benzhydryl ether was eluted with a mixture of benzene/petroleum ether (1:4). For identification purposes the N-ethyl-norscopine-3α-benzhydryl ether naphthalene-1.5-disulfonate was prepared. Melting point: 234–236° C. (with decomposition) from methanol/ether.

EXAMPLE VII

Scopine - (4' - chloro - benzhydryl) ether (6,7β - epoxy-tropine-3α-(4'-chloro-benzhydryl) ether)

A solution of 9.4 grams of 4-chloro-diphenyl chloromethane in 6 cubic centimeters of absolute benzene was added dropwise at 110° C. whilst stirring within 2 hours to a mixture of 7.9 grams of 6β-acetoxy-tropine and 2.0 grams of sodium carbonate. Subsequently the reaction mixture was maintained at 125° C. for another 5 hours. After cooling, 100 cubic centimeters of water and 100 cubic centimeters of benzene were added, the mixture was shaken thoroughly, the benzene layer was separated, and the aqueous part was extracted again with altogether 260 cubic centimeters of benzene. The combined benzene extracts were shaken out with the total amount of 360 cubic centimeters of ice-cooled aqueous 2 N-hydrochloric acid, the aqueous hydrochloric extract was washed with 200 cubic centimeters of ether, and rendered alkaline whilst cooling with 30 percent aqueous sodium hydroxide solution. The alkaline aqueous medium was shaken out with a total of 500 cubic centimeters of benzene, the united benzene extracts were dried over magnesium sulfate, and benzene removed under reduced pressure. The residual 6β-acetoxy-tropine-3α-(4'-chloro-benzhydryl) ether was identified as naphthalene-1.5-disulfonate. Melting point: 234–235° C. (with decomposition).

From the benzene solution which was extracted with aqueous 2 N-hydrochloric acid could be obtained another portion of 6β-acetoxy-tropine-3α-(4'-chloro-benzhydryl) ether using the following procedure: The benzene solution was dried over magnesium sulfate, and the benzene removed in vacuo. The residue was taken up in water, the aqueous solution washed with ether and saturated whilst cooling with potassium carbonate. The alkaline mixture was filtered and the filtrate subsequently extracted several times with chloroform. The combined chloroform extracts were dried over magnesium sulfate, the chloroform removed in vacuo. The oily residue was dissolved in anhydrous methanol and treated with dry hydrogen bromide gas until an acidic reaction of pH 2 was obtained. Ether was added and the mixture kept for some time in the cold, when the 6β-acetoxy-tropine-3α-(4'-chloro-benzhydryl) ether hydrobromide crystallized out. Melting point: 242–243° C. (with decomposition) from methanol/ether.

A solution of 2.1 grams of 6β-acetoxy-tropine-3α-(4'-chloro-benzhydryl) ether naphthalene-1.5-disulfonate in 10 cubic centimeters of ethanol and 20 cubic centimeters of aqueous 3 N-sodium hydroxide solution was boiled for 4½ hours on the steam bath, whereupon a clear solution was obtained. Then, ethanol was removed under reduced pressure, the residue taken up in 20 cubic centimeters of water and 30 cubic centimeters of chloroform. Some byproduct (melting point over 300° C.) was filtered off. The chloroform layer of the filtrate (chloroform/water mixture) was separated and the aqueous part was extracted again with altogether 100 cubic centimeters of chloroform. The combined chloroform extracts were dried over magnesium sulfate and the chloroform removed in vacuo. The residual 6β-hydroxy-tropine-3α-(4'-chloro-benzhydryl) ether was crystallized from a mixture of benzene/petroleum ether. Melting point: 96–98° C.

A solution of 4.7 grams of 6β-hydroxy-tropine-3α-(4'-chloro-benzhydryl) ether in 19 cubic centimeters of absolute pyridine was treated with 1.0 cubic centimeter of methane sulfonic acid chloride, whereby it became warm. The reaction mixture was allowed to stand at room temperature for 1 hour and was subsequently kept gently boiling under reflux for 3 hours. After cooling, the reaction mixture was treated with 45 cubic centimeters of chloroform and shaken out with a total amount of 90 cubic centimeters of 8 percent aqueous sodium carbonate solution in 6 portions. The chloroform solution was then dried over magnesium sulfate, and the chloroform removed in vacuo. The residue was treated with the calculated amount of a methanolic solution of naphthalene-1.5-disulfonic acid, whereupon the 6β-mesyloxy-tropine-3α-(4'-chloro-benzhydryl) ether naphthalene-1.5-disulfonate separated out in crystalline form. Melting point: 185–187° C. (with decomposition) after recrystallization from methanol.

3.0 grams of 6β-mesyloxy-tropine-3α-(4'-chlorobenzhydryl) ether, 5.8 grams of triethylamine and 0.2 cubic centimeter of diethyl aniline were sealed under nitrogen in a pressure tube and heated at 125–135° C. for 2 hours. The content of the pressure tube was then strongly cooled, and the liquid portion decanted. This yellow solution was concentrated in vacuo, taken up in 40 cubic centimeters of chloroform and washed twice with 20 cubic centimeters of aqueous saturated sodium carbonate solution each time. The chloroform solution was dried over magnesium sulfate, and the chloroform and the residual triethyl amine were removed under reduced pressure. 300 milligrams of trifluoro acetic acid were added with cooling to a solution of 0.98 gram of the residue of 6.7-tropenyl-3α-(4'-chloro-benzhydryl) ether in 10 cubic centimeters of methylene chloride, and the mixture was subsequently treated at a maximum temperature of 25° C. within 30 minutes, whilst stirring, with a solution of trifluoro peracetic acid (prepared from 1.1 grams of trifluoro acetic anhydride and 0.15 gram of 90 percent aqueous hydrogen peroxide) in 5 cubic centimeters of methylene chloride. Stirring was continued at room temperature for another 30 minutes, the reaction mixture was extracted with a total amount of 40 cubic centimeters of water, the aqueous solution was rendered alkaline with 30 percent aqueous sodium hydroxide solution and extracted with a total amount of 100 cubic centimeters of chloroform. The combined chloroform extracts were dried over magnesium sulfate, and the chloroform removed in vacuo. From the oily residue the scopine-(4'-chloro-benzhydryl) ether was isolated by usual methods as naphthalene-1.5-disulfonate. Melting point: 223–228° C. (with decomposition) from methanol/ether.

Example VIII

*Scopine benzhydryl ether (6,7-epoxy-tropine-3α-benzhydryl ether)*

A solution of 0.96 gram of diphenyl bromomethane in 3 cubic centimeters of anhydrous benzene was added dropwise at 110° C. with stirring within 1½ hours to a mixture of 0.6 gram of scopine and 0.3 gram of sodium carbonate. Subsequently, the reaction mixture was maintained at 125° C. for another 3 hours with further stirring. After cooling, 50 cubic centimeters of water and 50 cubic centimeters of benzene were added, the mixture was shaken thoroughly, the benzene layer was separated, and the aqueous portion was extracted again with another 200 cubic centimeters of benzene. The united benzene extracts were shaken out with a total of 250 cubic centimeters of ice-cooled aqueous 2 N-hydrochloric acid, the aqueous extract was washed with 50 cubic centimeters of ether and rendered alkaline whilst cooling with aqueous 30 percent aqueous sodium hydroxide solution. The alkaline aqueous medium was shaken out with altogether 350 cubic centimeters of benzene, the combined benzene extracts were dried over magnesium sulfate, and the benzene removed in vacuo. The residue of scopine benzhydryl ether was treated with the calculated amount of methanolic hydrogen chloride, whereupon, after addition of ether, the hydrochloride crystallized out. After recrystallization from methanol/ether the scopine benzhydryl ether hydrochloride melted at 209–212° C. (with decomposition) and showed in a mixed melting point with a sample, prepared according to Example I, no depression.

Having thus disclosed the invention, what is claimed is:

1. A compound selected from the class consisting of benzhydryl ethers of scopine having the following general formula:

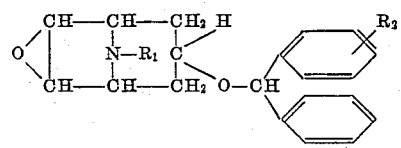

wherein $R_1$ is lower alkyl and $R_2$ is selected from the group consisting of hydrogen and halogen, the acid addition salts of said ethers with pharmacologically acceptable acids, and pharmacologically acceptable lower alkyl quaternary salts of said ethers.

2. N - alkyl - 6,7β - epoxy - nortropine - 3α - benzhydryl ethers.

3. N - methyl - 6,7β - epoxy - nortropine - 3α - benzhydryl ether.

4. N - ethyl - 6,7β - epoxy - nortropine - 3α - benzhydryl ether.

5. N - methyl - 6,7β - epoxy - nortropine - 3α - (4'-chloro-benzhydryl) ether.

References Cited in the file of this patent

UNITED STATES PATENTS

| | | |
|---|---|---|
| 2,595,405 | Phillips | May 6, 1952 |
| 2,706,198 | Weijlard | Apr. 12, 1955 |
| 2,782,200 | Nield et al. | Feb. 19, 1957 |
| 2,834,783 | Bloom et al. | May 13, 1958 |

FOREIGN PATENTS

| | | |
|---|---|---|
| 1,162,486 | France | Apr. 8, 1958 |

OTHER REFERENCES

Fodor: Zeit. Angew. Chemie, vol. 68, p. 188 (1956).